Nov. 22, 1955  F. W. BROOKS  2,724,460
SELF ADJUSTING BRAKE
Filed Aug. 22, 1950
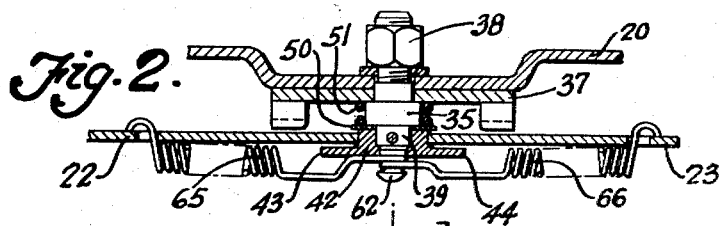
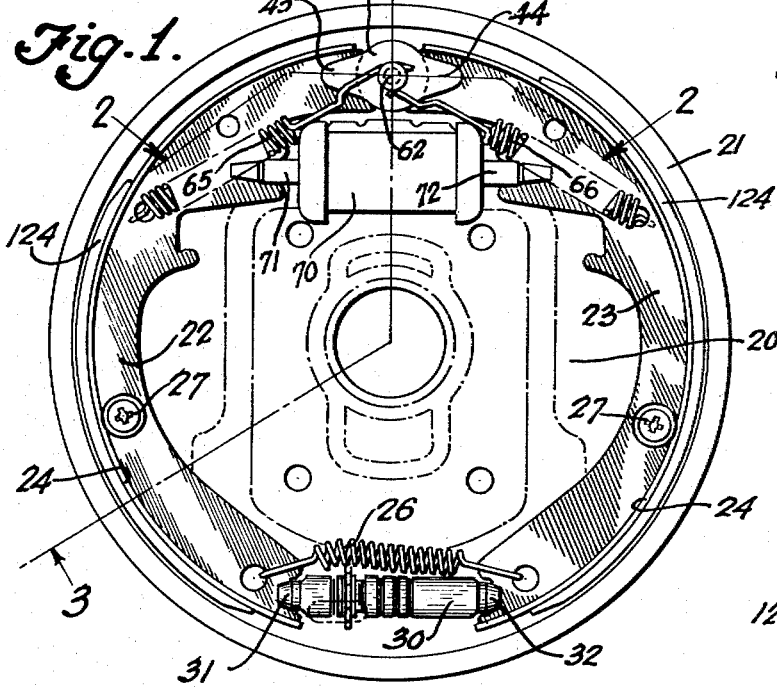
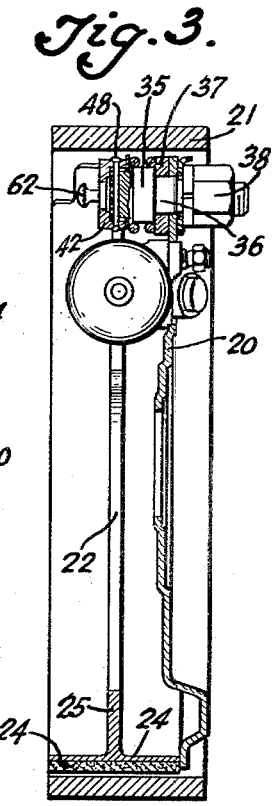
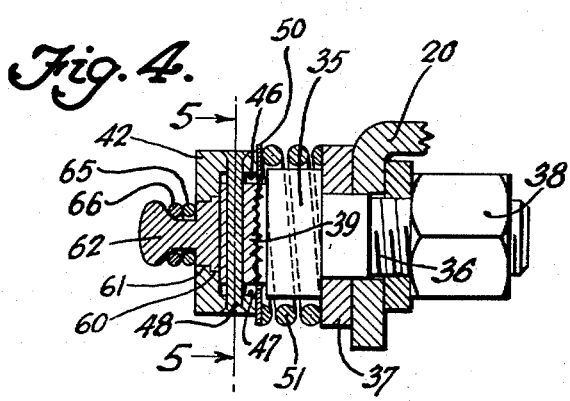
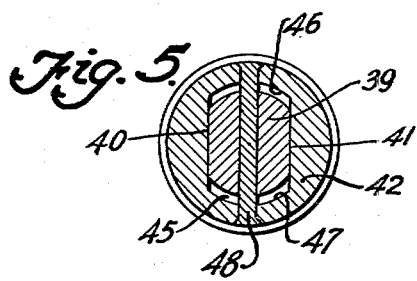
INVENTOR
FRANK W. BROOKS
BY
Willis, Hardman and Fisher
his ATTORNEYS

United States Patent Office 2,724,460
Patented Nov. 22, 1955

2,724,460
SELF ADJUSTING BRAKE

Frank W. Brooks, Dayton, Ohio, assignor to General Motors Corporation, Detroit, Mich., a corporation of Delaware Application August 22, 1950, Serial No. 180,742

3 Claims. (Cl. 188—78)

This invention relates to improvements in brakes.

Brakes for automotive vehicles and particularly internally expanding brakes have been provided with manual adjusting means, accessible from outside the brake and operative to adjust the position of the brake shoe or shoes relatively to the drum they are adapted frictionally to engage. Such adjustments made by feel only and where actual observation is impossible, generally are imperfect and premature wear takes place due to the fact that the brake shoes are not in concentricity with the rotating drum.

It is among the objects of the present invention to provide a simple element within the brake assembly which not only acts as an abutment member for the adjacent ends of the two, oppositely disposed brake shoes, but also serves as an automatic adjusting means, operative, in response to the moving of the brake shoes into frictional drum engagement, to locate said brake shoes in substantial concentricity with the drum.

A further object of the present invention is to provide an automatic brake shoe locating means which yieldably holds the brake shoe assembly in adjusted substantial concentricity with the drum and which will, in case of brake wear, automatically readjust the shoes relatively to the drum for maintaining concentricity therebetween.

Further objects and advantages of the present invention will be apparent from the following description, reference being had to the accompanying drawing wherein a preferred embodiment of the present invention is clearly shown.

In the drawing:

Fig. 1 is a front view of a brake assembly equipped with the present invention.

Fig. 2 is a part sectional view taken substantially along the line and in the direction of the arrows 2—2 in Fig. 1.

Fig. 3 is a part sectional view taken substantially along the line and in the direction of the arrow 3—3 in Fig. 1.

Fig. 4 is a full sized, part sectional view of the adjusting anchor post mechanism shown at reduced dimensions in Fig. 3.

Fig. 5 is a transverse section taken along the line and in the direction of the arrows 5—5 of Fig. 4.

The brake mechanism shown in Figs. 1, 2 and 3 is of standard design and construction such as is used on many of the present day automobiles. It comprises a stationary backing plate 20 rigidly secured to a suitable part on the vehicle. The rotatable drum 21 is secured to the vehicle wheel plate so as to be rotated therewith. This brake mechanism being of the internal expanding type, has two separate, oppositely disposed brake shoes 22 and 23 within the drum 21. Each shoe consists of an arcuate band 24 provided with an internal, angular stiffening web or flange 25. A lining or cover of any suitable frictional material 124 is attached to the band 24, the curvature of each band 24 and its lining 124 corresponding to the circular inner surface of the drum 21 which the brake shoes are adapted frictionally to engage for braking purposes. The regular standard means indicated at 27 are provided to secure the brake shoes to the backing plate so that said shoes are movable radially and circumferentially a limited distance relatively to the axis of the drum.

Any suitable connecting abutment member 30 has oppositely disposed forked elements 31 and 32 in which two adjacent ends of the respective brake shoes 22 and 23 are held seated by the spring 26 anchored to both shoes 22 and 23. Abutment member 30 is free to move relatively to the stationary backing plate 20.

Substantially diametrically opposite to abutment member 30, another abutment member is provided for the other two adjacent ends of brake shoes 22 and 23. This second abutment member consists of an anchor pin 35 having a shank portion 36 extending through aligned holes in the backing plate 20 and any reinforcing plates 37 provided thereon, said shank 36 having threads to receive nut 38 which rigidly secures the anchor pin to the backing plate. The anchor pin 35 has a reduced diameter portion 39 which, as shown in Fig. 5, has two parallel, flat side surfaces 40 and 41. A winged abutment collar 42, having diametrically oppositely extending ears or wings 43 and 44, has a central opening therethrough said opening having three distinct portions of different dimensions and one being of a distinctive shape. This one recess portion 45 is adapted telescopically to receive the anchor pin portion 39. Recess portion 45 has two parallel walls, spaced, slidably to fit over and upon the two flat surfaces 40 and 41 of the anchor pin portion 39. In order that collar 42 will be capable of diametral movement relatively to the anchor pin 35 the oppositely disposed arcuated wall surfaces 46 and 47, which coincide with the arcuated wall surface of portion 39 of the anchor pin, are described at a greater radius than said anchor pin surfaces. To prevent axial movement of the collar relatively to the anchor pin and yet provide for the relative diametral movement between said collar and anchor pin, a pin 48 extends slidably through a diametral hole in the anchor pin portion 39, said hole being parallel with and midway between the flat side walls 40 and 41, the pin 48 being secured in holes in the collar 42. Thus it may be seen that collar 42 may move transversely of anchor pin portion 39 in either direction of the axis of pin 48, this movement being limited by the engagement of either arcuated surfaces 46 or 47 with the adjacent arcuated surfaces of the anchor pin portion 39 respectively.

To prevent such movement of collar 42 relative to pin portion 39 excepting for automatic adjustment purposes, a yieldable friction device is provided between said collar and the anchor pin 35. This device consists of a washer 50 fitting about pin portion 39 and urged into frictional engagement with the inner end surface of collar 42 by a comparatively heavy and stiff spring 51 which is interposed between said washer 50 and the reinforcing plate 37 when the anchor pin 35 is assembled upon the backing plate 20. The diameter of washer 50 is greater than the diameter of the collar 42 thus an abutment is provided by said washer which prevents displacement of the two brake shoes 22 and 23 in one direction, the adjacent ends of which normally engage and rest against the outer annular wall of the collar 42. Displacement of the brake shoes in the opposite direction is prevented by the oppositely disposed wings 43 and 44 on the collar 42. This feature is clearly illustrated in the Fig. 2.

As previously stated, the central opening in collar 42 has three different portions varying in shape and dimensions. The one portion has flat sides and arcuated ends, the other two portions being annular recesses 60 and 61, the latter being the outer recess and the smaller in diameter. An abutment lug or pin 62 has inner end portions nesting in recesses 60 and 61 the inner end surface of said lug 62 engaging the adjacent end of the anchor pin portion 39 thereby locking said lug in collar 42 when the collar 42 is secured to the anchor pin by the pin 48. The headed portion of lug 62 extends coaxially from the collar 42 as shown in Figs. 1, 2 and 4. Lug 62 provides means for securing one end of each retractor spring 65 and 66, the other ends of the respective springs being anchored to the shoes 22 and 23, yieldably urging said shoes so that their ends engage collar 42 and the brake or friction lining 124 on the shoes is normally held out of engagement with the rotating drum 21. This construction provides a common attachment pin or lug for the two retractor springs, said pin or lug being supported upon and movable with the adjustable collar engaged by the adjacent ends of the respective brake shoes 22 and 23.

Power means in the form of an hydraulic wheel cylinder 70 is interposed between the brake shoes 23 and 24, said power means having oppositely disposed actuator rods 71 and 72 respectively engaged by the brake shoes 22 and 23. A third spring 26 interposed between the brake shoes hold their respective ends in engagement with the abutment elements 31 and 32 of the member 30.

Ordinarily, after the brake shoe assembly is placed within the drum, the anchor pin supporting the brake shoe assembly is adjusted manually from outside the backing plate for the purpose of bringing the brake shoes into concentricity with the drum so that when said shoes are moved outwardly into frictional, braking engagement with said drum, substantially even contact will be made. If concentricity is not established, then portions of the brake shoes will be brought into braking engagement with the drum before other portions thus resulting in premature and uneven wear of the shoes.

The present invention provides for automatic adjustment initially and whenever necessary. When assembling the brake concentricity is not considered, for upon the first or initial brake application, the entire shoe assembly is automatically located due to the movable suspension of the assembly within the brake drum and after location the assembly is yieldably held in the adjusted position.

To establish this initial brake shoe application to the brake drum, the power device or wheel cylinder 70 is energized so that its two, oppositely disposed actuators 71 and 72, engaged by the shoes under the effect of springs 65, 66 and 26, will move shoes 22 and 23 outwardly into engagement with the drum 21, said shoes pivoting about the abutments 31 and 32 respectively of the anchor member 30, interposed between two adjacent ends of said shoes. The opposite, adjacent ends of shoes 22 and 23 are normally in engagement with the collar 42 slidable on the anchor pin 35 attached to the braking plate 20.

During the braking application, with the drum rotating, the primary brake shoe, either one dependent upon drum rotation, actuates the secondary brake shoe which pivots about the collar 42 on the anchor pin. For instance, if the drum 21 rotates clockwise as regards Fig. 1, the brake shoe 23 becomes the primary shoe and its contact with the clockwise rotating drum will cause the abutment link 30 and shoe 22 to be moved clockwise, shoe 22 pivoting upon or engaging collar 42. If the shoe assembly is initially above center too far, then this engagement of the shoes with the drum and shoe 22 with collar 42 will move the shoe assembly into concentricity with the drum, the downward thrust of the shoes into concentricity with the drum moving the collar 42 downwardly on the anchor pin portion 39 against the effect of the spring loaded washer 50 which yieldingly holds the collar 42 in adjusted position but which is overcome by this down thrust to attain a proper adjustment and then hold it.

It will be seen that springs 65 and 66 being anchored at both ends to adjusted elements will be moved bodily during automatic adjustments and thus in no way changing their tension or the direction of their biasing force. Such change of bias would, however, take place if the two ends of the springs 65 and 66 opposite their ends attached to the respective brake shoes, were attached to an element or elements not adjusted or movable with the brake shoes.

From the aforegoing description it may be seen that the present invention automatically maintains concentricity of the brake shoes with the brake drum and thereby eliminates the inefficient and unsatisfactory "adjustment by feel" which is necessary under the old and customary method of making adjustments manually from outside the housing in which the shoes are contained. Thus brake performance is stabilized and premature, uneven wear, causing expensive replacements and service, is eliminated. The brake shoe assembly of the present invention is freely suspended when released and concentricity is maintained by repeated, automatic adjustments when necessary.

While the embodiment of the present invention as herein disclosed, constitutes a preferred form, it is to be understood that other forms might be adopted.

What is claimed is as follows:

1. In a brake having two oppositely disposed brake shoes movably supported upon a stationary plate and having means interposed between the brake shoes for moving said brake shoes into frictional engagement with a rotating drum and spring means connected with the brake shoes for withdrawing the same from engagement with the brake drum and an abutment member interposed between each two adjacent ends of the brake shoes, the one abutment member being free of the stationary plate and the second abutment member comprising an anchor pin secured to the stationary plate; the improvement in the second abutment member comprising; a post immovably secured to the stationary plate of the brake, said post extending normal from the plate and having the projecting end thereof provided with flat parallel guide surfaces on diametrically opposite sides of the post that are parallel with the axis of the brake, a collar on said post for engagement on opposite sides thereof by adjacent ends of the brake shoes, said collar having a recess in one side provided with parallel flat surfaces engaging those on said post for sliding guide movement on said post, said recess being dimensionally larger than said post in one transverse direction to provide for transverse movement of said collar on said post in one direction only perpendicular to the axis of the brake, said collar including a wall transverse of the axis of the collar, fastening means between said collar and said post attaching the collar on said post against axial movement thereof while permitting the said transverse movement on the post, and pin means extending through said wall of said collar for attachment of the brake spring means to said collar for movement of the brake spring means concurrently with the collar and the brake shoes engaging the same, said pin means having an enlargement on one end thereof positioned between said wall and said post to retain said pin means in said collar.

2. In a brake having two oppositely disposed brake shoes movably supported upon a stationary plate and having means interposed between the brake shoes for moving said brake shoes into frictional engagement with a rotating drum and spring means connected with the brake shoes for withdrawing the same from engagement with the brake drum and an abutment member interposed between each two adjacent ends of the brake shoes, the one abutment member being free of the stationary plate and the second abutment member comprising an anchor pin secured to the stationary plate; the improvement in the second abutment member comprising; a post immovably secured to the stationary plate of the brake, said post extending normal from the plate and having the projecting end thereof provided with flat parallel guide surfaces on diametrically opposite sides of the post that are parallel with the axis of the brake, a collar on said post for engagement on opposite sides thereof by adjacent ends of the brake shoes, said collar having a recess in one side provided with parallel flat surfaces engaging those on said post for sliding guide movement on said post, said recess being dimensionally larger than said post in one transverse direction to provide for transverse movement of said collar on said post in one direction only perpendicular to the axis of the brake, said collar including a wall transverse of the axis of the collar, pin means extending transversely through said collar and said post attaching the collar on said post against axial movement thereof while permitting the said transverse movement on the post, and pin means extending through said wall of said collar for attachment of the brake spring means to said collar for movement of the brake spring means concurrently with the collar and the brake shoes engaging the same, said pin means having an enlargement on one end thereof positioned between said wall and said post to retain said pin means in said collar.

3. In a brake having two oppositely disposed brake shoes movably supported upon a stationary plate and having means interposed between the brake shoes for moving said brake shoes into frictional engagement with a rotating drum and spring means connected with the brake shoes for withdrawing the same from engagement with the brake drum and an abutment member interposed between each two adjacent ends of the brake shoes, the one abutment member being free of the stationary plate and the second abutment member comprising an anchor pin secured to the stationary plate; the improvement in the second abutment member comprising; a post immovably secured to the stationary plate of the brake, said post extending normal from the plate and having the projecting end thereof provided with flat parallel guide surfaces on diametrically opposite sides of the post that are parallel with the axis of the brake, a collar on said post for engagement on opposite sides thereof by adjacent ends of the brake shoes, said collar having a recess in one side provided with parallel flat surfaces engaging those on said post for sliding guide movement on said post, said recess being dimensionally larger than said post in one transverse direction to provide for transverse movement of said collar on said post in one direction only perpendicular to the axis of the brake, said collar including a wall transverse of the axis of the collar, pin means extending transversely through said collar and said post attaching the collar on said post against axial movement thereof while permitting the said transverse movement on the post, pin means extending through said wall of said collar for attachment of the brake spring means to said collar for movement of the brake spring means concurrently with the collar and the brake shoes engaging the same, said pin means having an enlargement on one end thereof positioned between said wall and said post to retain said pin means in said collar, a washer on said post between said collar and the stationary plate in frictional engagement with the face of said collar having said recess, and compression spring means between said washer and the stationary plate urging the washer into frictional engagement with said collar whereby to resist the said transverse movement of said collar on said post.

References Cited in the file of this patent

UNITED STATES PATENTS

| | | |
|---|---|---|
| 1,989,202 | LaBrie | Jan. 29, 1935 |
| 2,168,700 | Burnett | Aug. 8, 1939 |
| 2,202,841 | Dick | June 4, 1940 |
| 2,238,254 | Dick | Apr. 15, 1941 |
| 2,239,916 | Hunt | Apr. 29, 1941 |
| 2,294,329 | Ayers et al. | Aug. 25, 1942 |